United States Patent
Cox

[19]

[11] Patent Number: 5,817,158
[45] Date of Patent: Oct. 6, 1998

[54] AIR/FOREIGN MATERIAL SEPARATOR

[75] Inventor: Donald G. Cox, Bargersville, Ind.

[73] Assignee: Air Equipment & Engineering, Inc., Martinsville, Ind.

[21] Appl. No.: 15,685

[22] Filed: Jan. 29, 1998

Related U.S. Application Data

[63] Continuation-in-part of Ser. No. 779,606, Jan. 29, 1997, abandoned, which is a continuation-in-part of Ser. No. 715,958, Sep. 19, 1996, abandoned, which is a continuation of Ser. No. 518,619, Aug. 23, 1995, abandoned, which is a division of Ser. No. 234,165, Apr. 28, 1994, Pat. No. 5,480,465.

[51] Int. Cl.$^6$ .................................................. B01D 45/00
[52] U.S. Cl. ................................ 55/472; 55/473; 55/482; 55/DIG. 14
[58] Field of Search ............................. 55/282, 318, 320, 55/321, 323, 327, 329, 330, 332, 431, 439, 470, 472, 473, 476, 477, 482, 486, 512, 527, DIG. 14; 95/277, 279; 96/191

[56] References Cited

U.S. PATENT DOCUMENTS

| | | | |
|---|---|---|---|
| 1,899,993 | 3/1933 | Spencer | 55/DIG. 14 |
| 1,922,688 | 8/1933 | Kamrath | 55/330 |
| 2,512,542 | 6/1950 | Goda | 55/DIG. 14 |
| 2,540,695 | 2/1951 | Smith et al. | 55/DIG. 14 |
| 4,584,003 | 4/1986 | Oda et al. | 55/431 |
| 4,764,191 | 8/1988 | Morelli | 55/431 |
| 5,061,305 | 10/1991 | Karmel | 55/476 |
| 5,480,465 | 1/1996 | Cox | 55/472 |

FOREIGN PATENT DOCUMENTS

| | | | |
|---|---|---|---|
| 1184355 | 12/1964 | Germany | 55/320 |
| 241602 | 10/1925 | United Kingdom | 55/DIG. 14 |

*Primary Examiner*—C. Scott Bushey
*Attorney, Agent, or Firm*—Woodard, Emhardt, Naughton, Moriarty & McNett

[57] ABSTRACT

A device for separating foreign material from air. An inlet conduit is mounted to a receptacle for receiving air and foreign material. A perforated tube is mounted within the inlet conduit and extends along the length thereof. An inner wall surrounds the perforated tube and forms a side air outlet through which a portion of the air within the passage formed by the tube may escape via a pump. The pump is operable to force the air and foreign material into the perforated tube so that the kinetic energy of the foreign material is sufficiently great to prevent the foreign material from adhering to the tube immediately adjacent the side air outlet. In a version of the preferred embodiment, a pair of pumps are in fluid communication with the perforated tube.

7 Claims, 6 Drawing Sheets

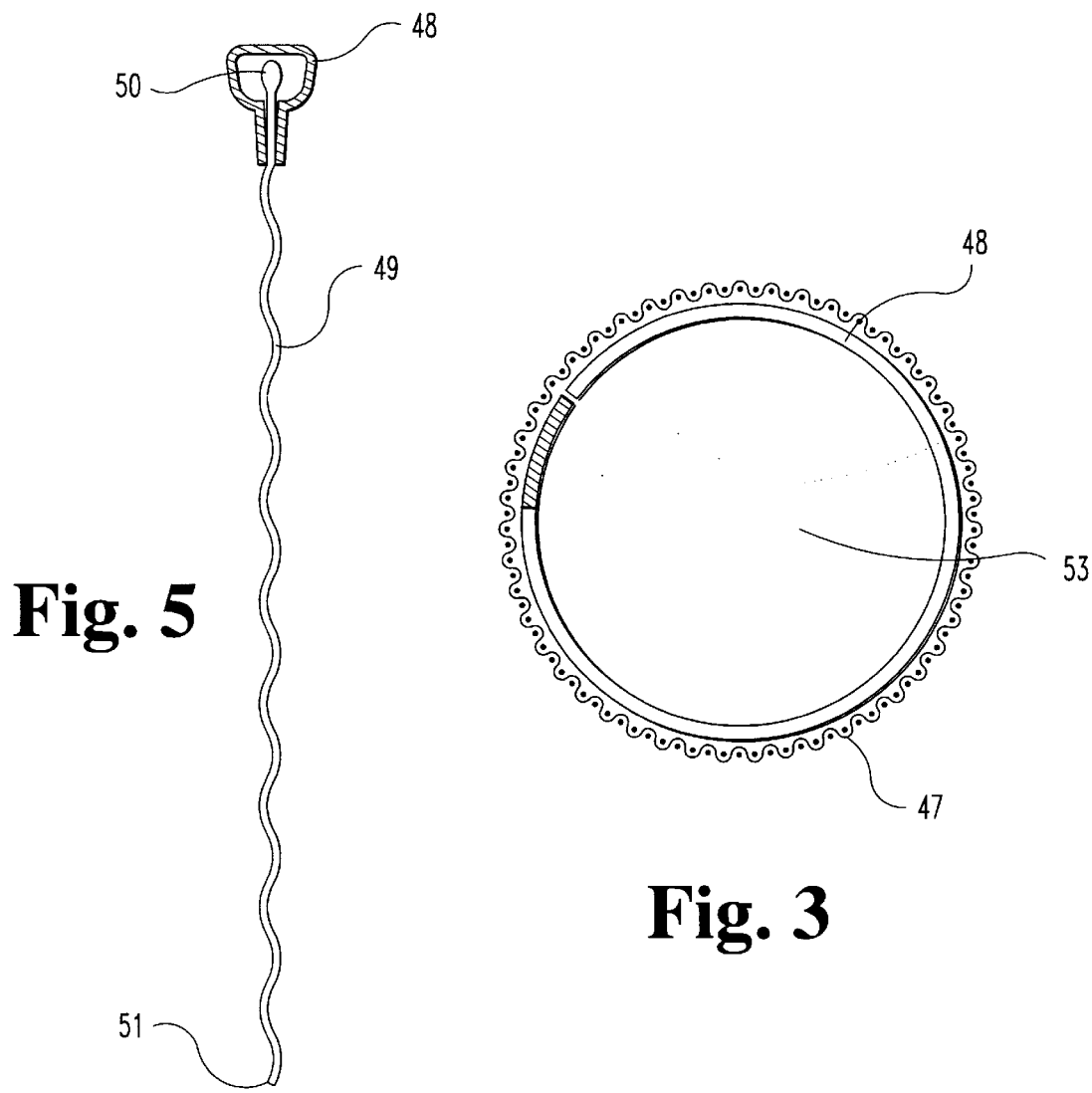

AIR/FOREIGN MATERIAL SEPARATOR

CROSS-REFERENCE TO RELATED APPLICATION

This application is a continuation-in-part of my U.S. patent application Ser. No. 08/790,606, filed Jan. 29, 1997, now abandoned, in turn, a continuation-in-part of abandoned U.S. patent application Ser. No. 08/715,958, filed Sep. 19, 1996, abandoned in turn, a continuation of abandoned U.S. patent application Ser. No. 08/518,619, filed Aug. 23, 1995, abandoned in turn, a divisional of U.S. patent application Ser. No. 08/234,165, now U.S. Pat. No. 5,480,465.

BACKGROUND OF THE INVENTION

1. Field of the Invention

This invention is in the field of filters and separators for separating foreign material from air.

2. Description of the Prior Art

One of the major problems in the industrial air handling business is the separation of air from particulate, mist, or other foreign material. In many manufacturing processes, scrap material is created and is conveyed with air to a central storage area by means of a cyclone or centrifugal separator. The prior separators typically utilize the force of gravity to separate the foreign material from the air, thereby requiring a separator chute of substantial length. The separators currently available are relatively large in size and in many cases extend through the ceiling and roof of the building. In contrast, the separator disclosed herein utilizes the kinetic energy of the foreign material to separate same from the air thereby allowing the separator to have a compact configuration. The relatively large area occupied by the current separators as well as the cost in modifying the building to receive the separator are major drawbacks associated with the current air separators and filters. Disclosed herein is a compact air separator which achieves the desired separation of foreign material from the air without requiring modification of the building.

In my U.S. Pat. No. 5,480,465, I disclose pulling air and foreign material through the entrance of a conduit and then extracting a portion of the air in a sideways direction from the conduit allowing the kinetic energy for the foreign material to carry the foreign material to a receiver. Depending upon the type of material to be conveyed and the size of the conduit, it is possible in many cases for the foreign material to adhere to the inside surface of the conduit particularly at the location where a portion of the air is being extracted from the conduit in a sideways direction. I have therefore designed an inner tube positioned within the conduit forming an annular passage therebetween while controlling the velocity in such a manner that the foreign material will not adhere to the interior surfaces.

SUMMARY OF THE INVENTION

One embodiment of the present invention is an air/foreign material separator comprising an inlet conduit having an air and foreign material inlet, an air and foreign material outlet, and an inner air outlet located therebetween. A tube mounted within and spaced apart from the inlet conduit forms an annular passage therebetween in fluid communication with the inner air outlet. The tube extends across the inner air outlet limiting flow of foreign material therethrough and has a plurality of holes through which some of the air within the tube flows into the passage being sized to limit flow of foreign material into the passage. A pair of pumps force air and foreign material through the inlet at an entrance velocity sufficiently great to force foreign material within the tube through the air and foreign material outlet and a portion of air within the tube into the air passage and out through the inner air outlet so that the velocity of air and foreign material within the tube toward the air and foreign material outlet is sufficient to move all of the foreign material past the inner air outlet to the air and foreign material outlet. A receiver connected to the air and foreign material outlet receives foreign material introduced via the inlet into the tube.

An object of the present invention is to provide a foreign material separator having means for preventing the material being conveyed from adhering to the inside surfaces of the separator.

It is a further object of the present invention to provide a new and improved separator for separating foreign material from air.

A further object of the present invention is to provide a compact air/foreign material separator.

In addition, it is an object of the present invention to provide a new and improved method for separating foreign material from air.

Related objects and advantages of the present invention will be apparent in the following description.

BRIEF DESCRIPTION OF THE DRAWINGS

FIG. 3 is an enlarged cross-sectional view taken along a line and viewed in the direction of arrows 3—3 of FIG. 2.

FIG. 4 is a fragmentary enlarged perspective view of the filter brush.

FIG. 5 is an enlarged cross-sectional view taken along a line and viewed in the direction of arrows of 5—5 of FIG. 4.

DESCRIPTION OF THE PREFERRED EMBODIMENTS

Figure 1:
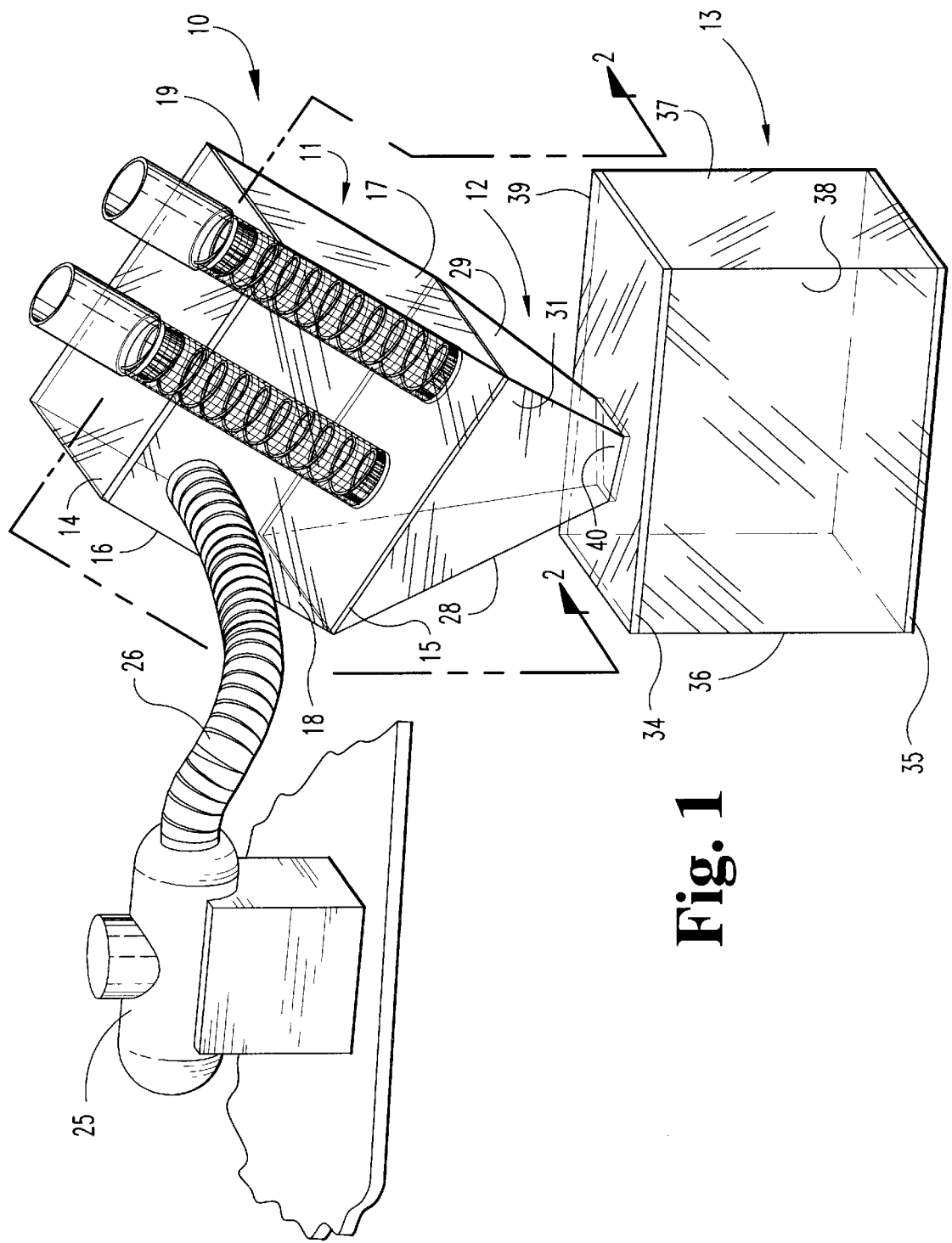
FIG. 1 is a perspective view of a first alternate embodiment of the air filter incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particular to FIG. 1, there is shown an apparatus or separator 10 for separating foreign material from air. Separator 10 includes a frame composed of an upper section 11 forming an interior chamber, a middle section 12 forming a funnel position between and connected to the upper section 11 and the lower section 13 forming a foreign material storage chamber. Upper section 11 has a six-sided box configuration with top wall 14 joined to a bottom wall 15 by means of a pair of side walls 16 and 17 along with a front wall 18 and back wall 19. The six walls have interior surfaces which form an interior chamber or passage 20 (FIG. 2) in which the foreign material is separated from the air.

Top wall 14 includes a plurality of inlet tubes allowing communication between the outside air and the interior chamber or passage 20. In the embodiment shown in FIG. 2, a pair of tubes 21 and 22 are mounted to the top wall 14, although it is to be understood that the present invention includes a separator having a single tube or a plurality of tubes greater than the tubes depicted in the drawing. Top wall 14 has a pair of holes 23 and 24 which are aligned with the hollow interior of the cylindrical tubes 21 and 22 fixedly mounted to wall 14.

A conventional pressure source means or air pump 25 (FIG. 1) is connected by means of a conventional conduit 26 having its opposite end fixedly attached to front wall 18. Hole 27 in wall 18 is aligned with the hollow interior of conduit 26 thereby allowing air pump 25 to withdraw air from the hollow interior of the upper section 11 via hole 27.

Middle section 12 includes a pair of side walls 28 and 29 joined to a back wall 30 and front wall 31 foreign an interior funnel shaped passage 33 extending between the upper section 11 and lower section 13. The top ends of walls 28–31 are mounted to wall 15 and to the top wall 34 of the lower section.

Lower section 16 has a six-sided box configuration with the top wall 34 being joined to its bottom wall 35 by means of a pair of side walls 36 and 37 along with a front wall 38 and back wall 39. The six walls of lower section 13 form an interior storage chamber for receiving foreign material which passes from the upper section 11 via the middle section. Top wall 34 has an opening 40 sized identically to the interior bottom opening of middle section 12. Wall 15 includes a pair of apertures 41 and 42 through which foreign material is ejected into the middle section. A door or other means is provided in the lower section 13 to enable the user to periodically empty the foreign material from the storage chamber formed within lower section 13.

Suitable guides extend between holes 23 and 24 in wall 14 and holes 41 and 42 in wall 15. The guides are operable to direct the foreign material towards the middle section 12 while allowing air to escape the upper section 11 via conduit 26. Thus, once pump 25 is energized, the pump is operable to force external air with foreign material into tubes 21 and 22 which form inlets into passage 20. The air pump thus, imparts forward velocity to the foreign material moving through tubes 21 and 22 forcing the air and foreign material to move in passage 20 along a path defined by the guides extending between holes 23, 24 and 41, 42 in a first direction shown by arrows 43 (FIG. 2).

Figure 2:
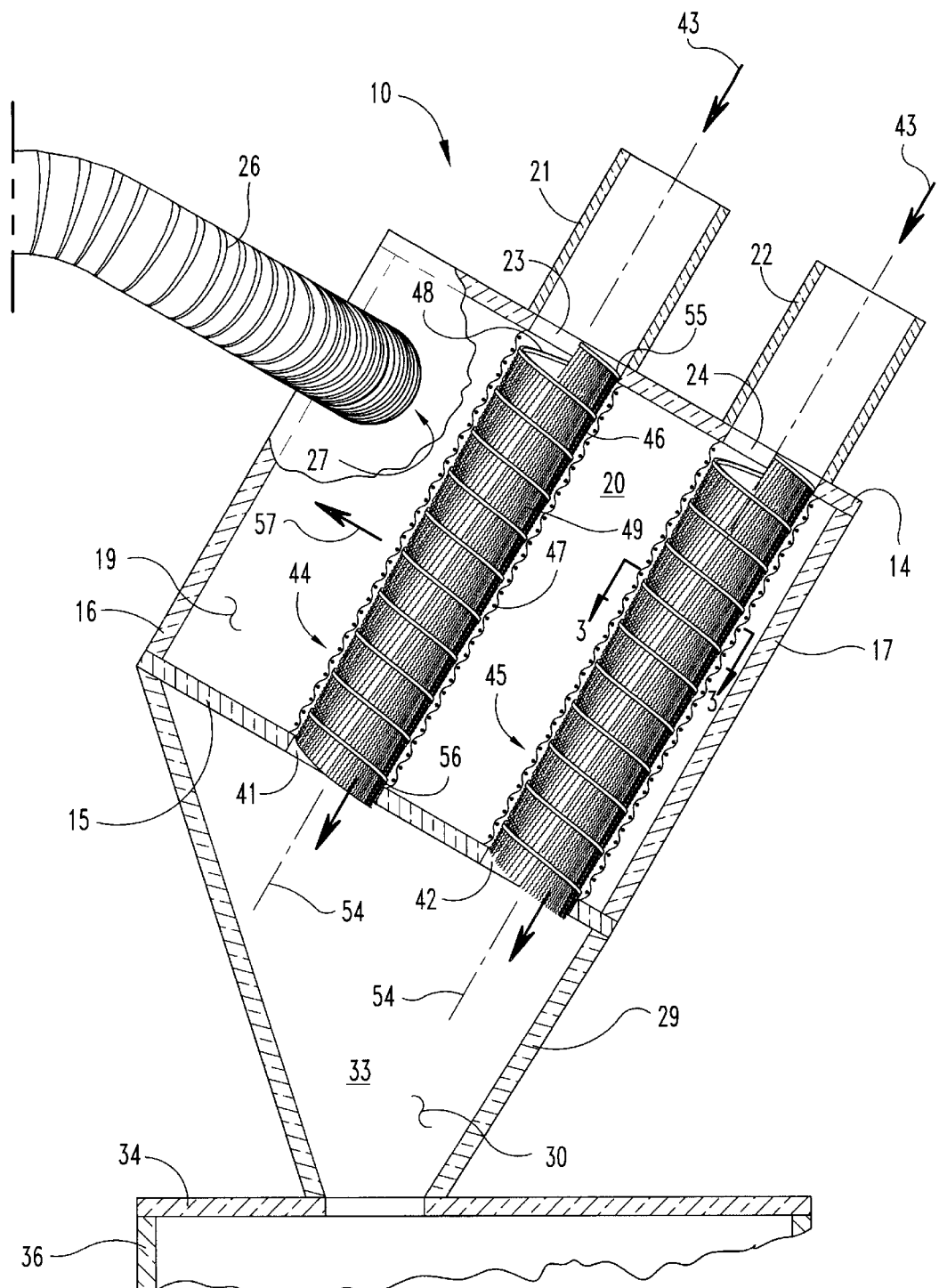
FIG. 2 is a cross-sectional view taken along a line and viewed in the direction of arrows 2—2 of FIG. 1.

In the alternate embodiment shown in FIG. 2, the guides extending between holes 23, 24 and 41, 42 include spiral-shaped brushes mounted within mesh screen frames. Guide 44 extends between holes 23 and 41 whereas guide 45 extends between holes 24 and 42. Guide 44 will now be described it being understood that an identical description applies to guide 45. Guide 44 includes a spiral-shaped brush 46 mounted within a mesh screen frame 47. Screen 47 is fragmented in FIG. 2 to illustrate the interior spiral brush 46. The brush includes a rigid frame 48 which extends in spiral fashion from wall 14 to wall 15. Cantileveredly mounted to and depending from frame 48 are a plurality of flexible bristles 49.

Frame 48 and bristles 49 may take a variety of configurations. In the embodiment illustrated in FIGS. 3–5, frame 48 has an inverted U-shaped configuration with the upper proximal ends 50 of the bristles being positioned within and secured to frame 48 with the distal ends 51 of the bristles being positioned therebeneath. Best results have been obtained by utilizing a bristle 49 having a crimped configuration along its length between proximal end 50 and distal end 51. Frame 48 tightly squeezes against the proximal ends 50 of the bristle preventing the bristles from escaping frame 48.

A filter frame extends around the spiral-shaped brush and is utilized to secure the brush within chamber 20. In the embodiment shown in FIGS. 2–5, the filter frame includes a mesh screen 47 (FIG. 3) having a cylindrical configuration in which is located the spiral-shaped frame 48 and bristles 49. The brush thereby forms a cylindrical passage or tunnel 53 which extends along a straight line or axis 54 (FIG. 2) with the axis extending centrally through holes 23 and 41 as well as tube 21. Mesh screen 47 is fixedly secured to walls 14 and 15 by conventional fastening devices. For example, small wires may be utilized to extend around frame 48 and one of the adjacent portions of screen 47. Likewise, the top end 55 and bottom end 56 of frame 48 may be fixedly secured respectively to walls 14 and 15. In an identical manner, guide 45 includes a spiral brush within a cylindrical screen forming a straight tunnels with axis 54.

Air outlet 27 provides a diverting means at a location in passage 20 between the inlets 23, 24 and foreign material outlets 41 and 42 with aperture 27 allowing pump 25 to pull the air flowing in the direction of arrows 43 (FIG. 2) through guides 44 and 45 and tunnel 53 and to allow the air to be diverted in a second direction shown by arrow 57 arranged perpendicular to axis 54. Bristles 49 are flexible, thereby allowing the air to flow around the bristles and escape tunnel 53 and flow into conduit 26. The kinetic energy for the foreign material flowing through the tunnels in the direction of arrows 43 is sufficient to carry the foreign material through the entire length of each tunnel exiting via holes 41 and 42 into the funnel-shaped passage 33. The forward velocity of the foreign material is sufficient to cause the foreign material to continue to move through the tunnels even though the air escapes the tunnels in the direction of arrow 57. Best results are obtained when the inlet velocity present within tubes 21 and 22 is between 500 feet per minute to 6000 feet per minute. The brushes provide blocking means to limit sideways movement of the foreign material in the direction of arrow 57 and thus ensure the foreign material continues to move in the direction of arrows 43 eventually exiting passage 20. The blocking means in the embodiment shown in FIG. 2 includes not only the brush with bristles but also the mesh screen 47 which cooperatively form two straight tunnels within passage 20 through which the foreign material moves. In order to prevent the foreign material, such as the paper strips, from sticking onto the bristles, the length of guides 44 and 45 should each be not less than 1.2 times the diameter of the guide to 2.7 times the guide diameter.

The present invention contemplates utilizing a screen 47, without utilizing a brush 46; however, the construction of the guides will depend on the types of foreign material being separated from the air. For example, a fine mesh screen in a cylindrical configuration forming screen 47 without the use of a brush 46 will in many cases become clogged if the foreign material is dust. On the other hand, if the mesh screen includes relatively large openings such as found in chicken wire, then to use such a screen without a brush 46 may result in foreign material, such as strips of paper, sticking to the screen in various locations. When utilizing both a screen 47 and a brush 46, the screen maintains the brush in position; however, the distal ends of the bristles are allowed to move thereby enabling the bristles to flex providing a self-cleaning feature for the brush preventing sticking of the foreign material on the brush.

Figure 6:
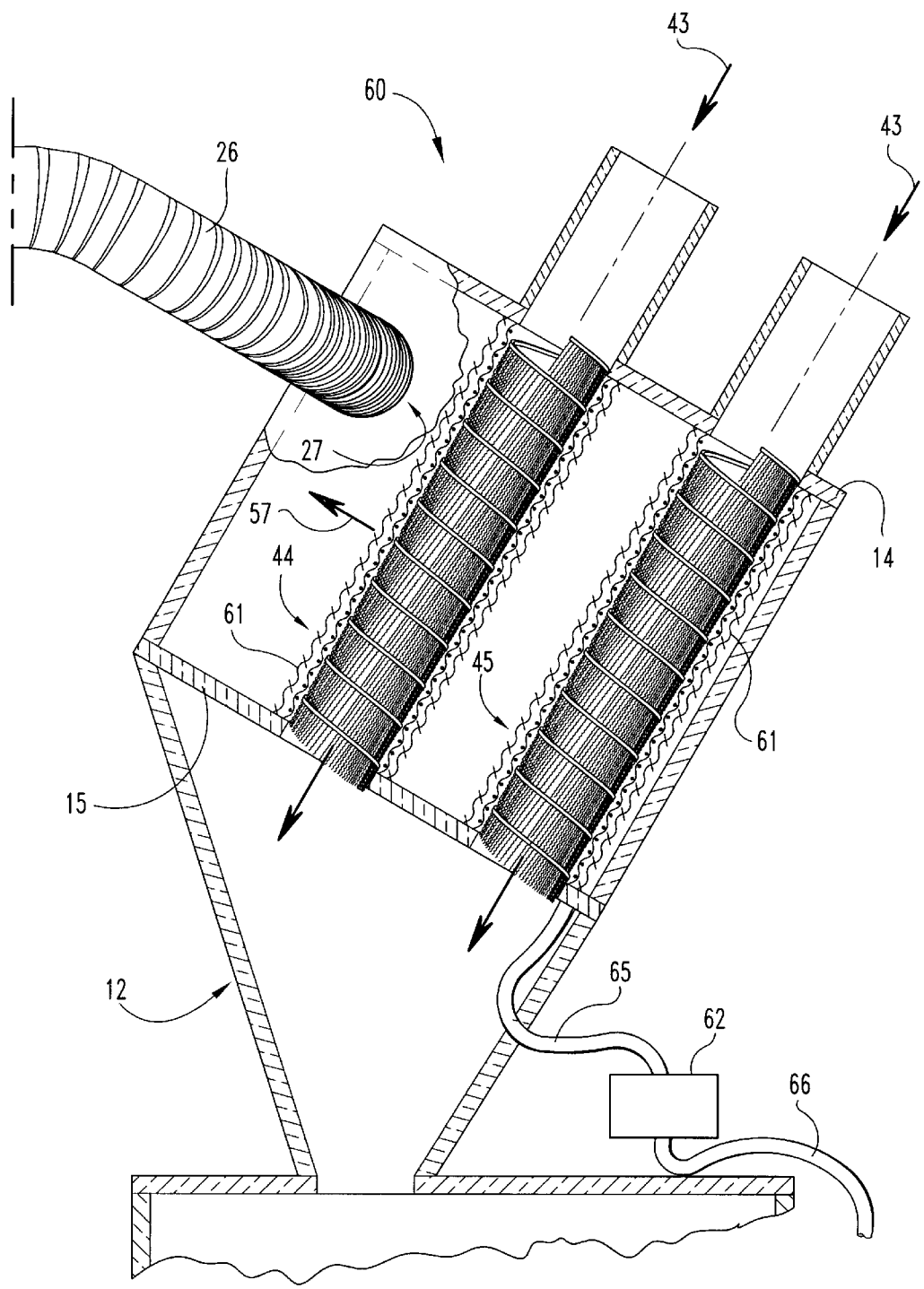
FIG. 6 is the same view as FIG. 2 only showing a second alternate embodiment of the present invention.

In the event liquid droplets or mist, such as water or oil, is to be removed from the air then an additional filter is provided which surrounds the brush and screen guide. Separator 60 (FIG. 6) is identical to separator 10 with the exception that an additional cylindrical filters 61 are mounted between walls 14 and 15 surrounding guides 44 and 45 and, thus, also surrounding the spiral-shaped brush and cylindrically-shaped screen for each guide and with the further exception that a liquid trap 62 is provided to gather liquid run-off from filters 61. Thus, the external air containing moisture is pulled in the direction of arrows 43 into the inlet tubes by operation of pump 25. The air continues to flow along a path extending through guides 44 and 45 until eventually the air exits guides 44 and 45 and filters 61 in the direction of arrow 57 and into conduit 26. The droplets of liquid having sufficient mass and velocity will continue to flow in the direction of arrows 43 exiting into the funnel-shaped middle section 12 and eventually being collected in the foreign material storage lower section 13. The finer liquid mist having insufficient velocity and mass to carry it forward will exit with the air in the direction of arrow 57 and be collected by filter 61 eventually draining downward atop bottom wall 15 and exiting chamber 20 via an outlet connected to tube 65, in turn, leading to the conventional liquid trap 62. An outlet tube 66 extends from the bottom of trap 62 into the lower section 13 for final collection of the liquid. Trap 62 may be of conventional design and be merely operable to allow liquid flow only in the direction from tube 65 to tube 66. In the embodiment shown in FIG. 6, a pair of cylindrical filters 61 are provided with each filter 61 surrounding a cylindrical mesh screen, in turn, surrounding the spiral-shaped brush. Best results will be obtained by producing filter 61 from pleated felt.

All of the separators (FIGS. 1, 6 and 7) function on the basis of utilizing the kinetic energy of the particles within the air entering the separator. The incoming air at a relatively high velocity causes the particulate to have sufficient kinetic energy so that the particulate will continue to move along a straight line through the guides while the much lighter air abruptly turns in a second direction exiting the guides. The heavier particulate with greater mass and velocity continues on through the separator and is thereby eventually collected. This principle not only creates a very efficient separator, but also a very compact separator without the necessity for the relatively long frames utilized by cyclone or centrifugal separators. In addition, a great number of inlet tubes may be provided in the upper section 11 of the separator allowing for collection and eventual separation of particulate laden air from many separate sources without decreasing the separation efficiency.

The separator disclosed herein has many different applications. For example, the separator may be used to replace a cyclone filter to remove paper, cardboard, wood chips, saw dust, etc. The separator disclosed herein is not only much shorter and smaller than a cyclone separator, but is less costly to operate. The separator may also act as a pre-filter and thus lessen the final filter loading. Such a pre-filter will remove sand or other particulate and thus prevent paper or cloth filter erosion. As previously described, the present filter may be utilized to remove oil or water mist as a primary separator. Such separation will agglomerate droplets and discharge the droplets through the guide to the storage section. Dirt will also be less likely to plug the slick brush surface than the prior flat filters. Further, the present filter may be used as a pre-cleaner for stringy material such as fiberglass. The fiberglass will not stick to the guide brush, whereas in the prior art filters, fiberglass will bind and not release from the cartridge or bag filters. In addition, the present filter may act as a spark trap. Many manufacturing processes create sparks or burning materials and will thereby ignite bag houses and cartridge collectors. By utilizing the spiral brush disclosed herein and by producing the bristles from metal, a much smaller and more positive spark trap will be provided.

Several collector and mounting configurations are possible with the present invention. For example, with a mist applicator, the inlet tubes and guides are arranged vertically, whereas for a paper separator, the inlet tubes and guides extend horizontal or slope downward because of height restrictions and incoming ducts extending horizontally. Certain applications may require final filters as small particulate or mist may pass through the spiral-shaped brush.

The method of separating foreign material or debris from air includes the steps of forcing air and foreign material with pressure source means such as a pump into a guide while imparting forward velocity to the foreign material. The air and foreign material are then guided along a path extending in a first direction. The direction of the air within the guide is then changed from the first direction to a second direction while allowing the forward velocity of the foreign material to cause the foreign material to continue to move in the first direction. The guide includes a flexible outlet which limits movement of the foreign material in the second direction. Last, the foreign material is collected once it leaves the guide.

Figure 7:
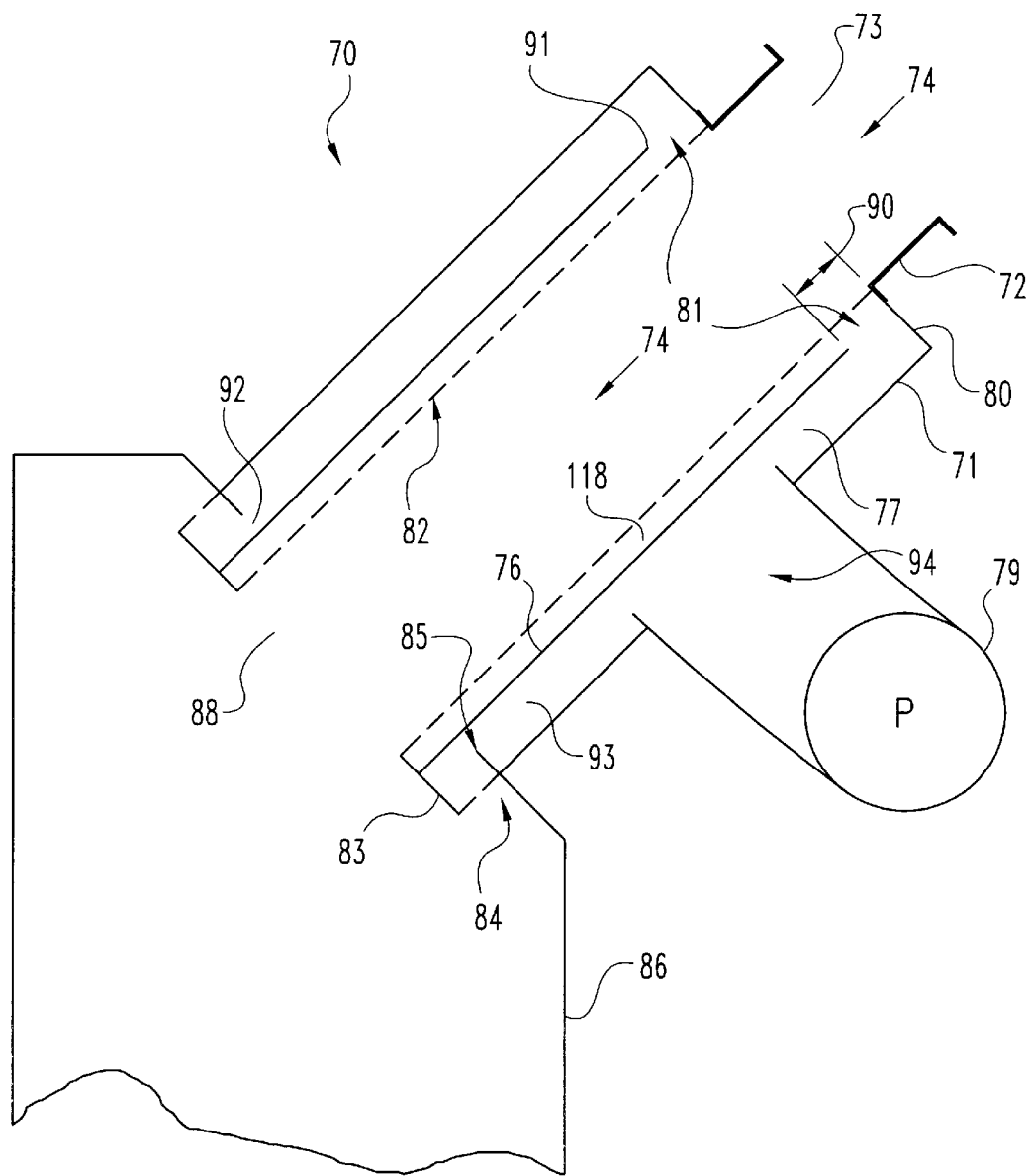
FIG. 7 is a fragmentary side cross-sectional view of the preferred embodiment of the filter incorporating the present invention.

The preferred embodiment of the separator is shown in FIG. 7 and is designed to prevent the foreign material passing through the conduit from adhering to the inside surface of the conduit. Mounted within the conduit is a screen extending the entire length thereof. A portion of the air is withdrawn perpendicular to the main passage. In the case of a vertically extending passage through which the air and foreign material is flowing, I have surrounded the vertically extending passage with a screen and then withdrawn a portion of the air through the screen and perpendicularly to the vertically extending passage. The foreign material will stick or adhere to the screen at the velocity of air flowing through the screen which I have termed the Impingement Velocity. When the impingement velocity exists, the velocity pressure acting on the particle surface is greater than the force of gravity acting on that particle. The critical area of the screen is that area where the impingement velocity through the screen is great enough to hold the material. If the kinetic energy of the particle moving through the main passage and parallel to the screen is great and the surface friction of the screen is small enough, the particle will move beyond the critical area without being impinged to the separation screen. Through experimentation, I have determined that with paper or cardboard material flowing through a vertical passage, the impingement velocity is about 250–350 feet per minute. Denser materials have greater impingement velocity limits since greater force is required to hold the material to the interior surface. In the event the paper or cardboard material is flowing through either a horizontal passage or through a passage oriented at a forty-five degree angle relative to the vertical, such as, shown in FIGS. 7 and 8 in lieu of a vertical passage, then the impingement velocity is about 200 feet per minute.

Figure 8:
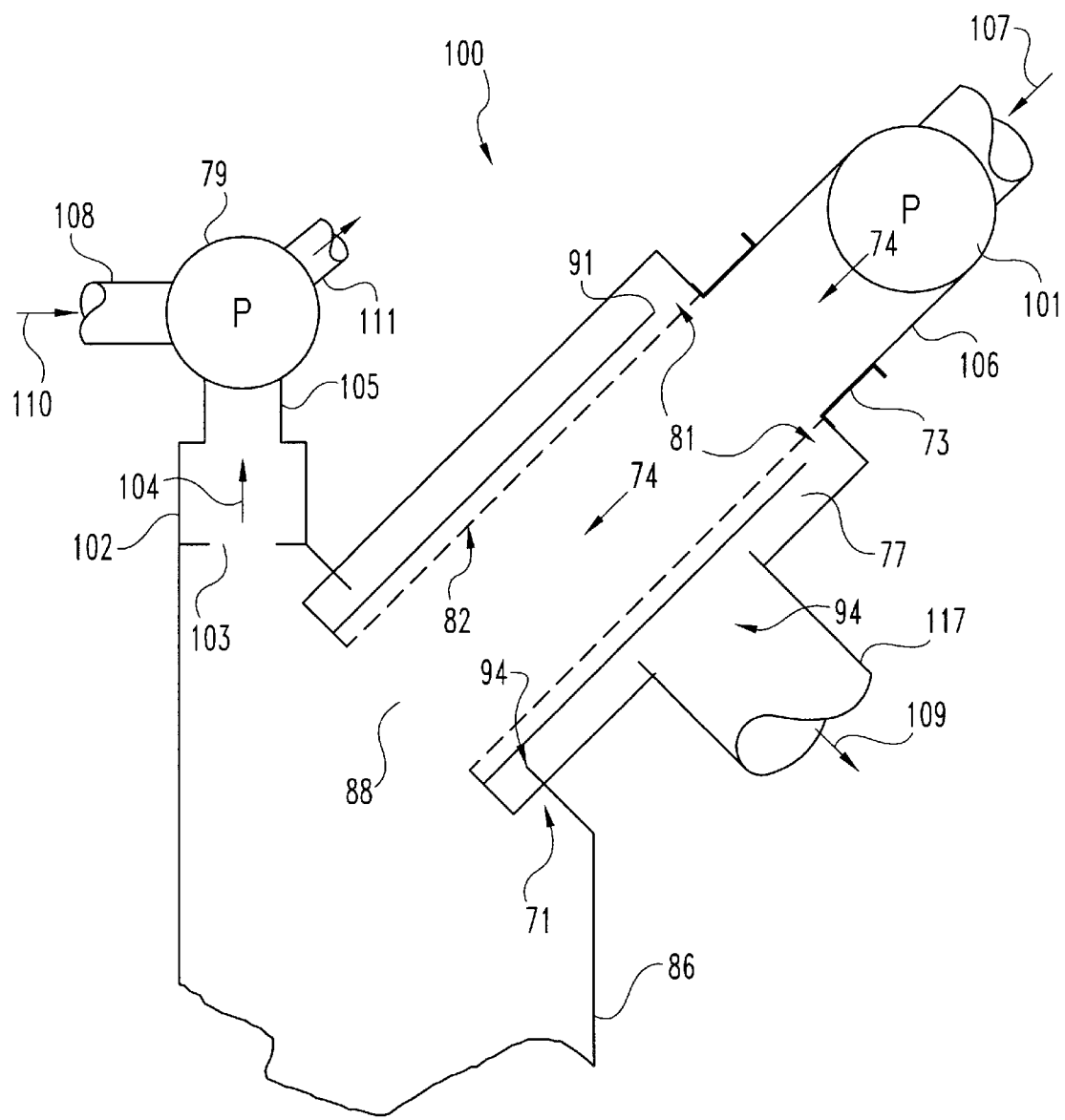
FIG. 8 is the same view as FIG. 7 only showing an alternate preferred embodiment.

The preferred embodiment of the separator is shown in FIGS. 7 and 8 is designed to prevent the foreign material passing through the conduit from adhering to the inside surface of the conduit. Mounted within the conduit is a screen extending the entire length thereof. Material separator 70 (FIG. 7) includes an inlet conduit having an air and foreign material inlet 73, an air and foreign material outlet 88 and an inner air outlet 81 located therebetween. The inlet conduit is formed by cylindrical sidewall 71 mounted to receptacle 86.

A perforated tube or screen 82 is mounted within and spaced apart from wall 71 forming an annular air passage 77 therebetween in fluid communication with the inner air outlet 81. Tube 82 extends across outlet 81 limiting flow of foreign material therethrough. Tube 82 is provided with a plurality of holes located along the length thereof which are sized to allow the air within the tube to flow into passage 77 but limit the flow of foreign material into passage 77.

A conventional air pump 79 is mounted to the inlet conduit and is operable to pull some of the air entering inlet 73 through outlet 81 and passage 77 and then exiting to the external atmosphere. The air pump forces the air and foreign material through inlet 73 at a minimum velocity of at least 800 feet per minute. The pump is also operable to force a portion of the air within the inlet or passage 73 through outlet 81 at a velocity greater than 350 feet per minute. The pump is sufficiently sized to withdraw air and foreign material through inlet 73 at an entrance velocity sufficiently great to force the foreign material within tube 82 to flow into receptacle 86 via outlet 88 while a portion of the air exits tube 82 via outlet 81.

As previously discussed, there is a tendency for the foreign material such as paper or cardboard material to adhere to tube 82 along a critical length 9O of tube 82 immediately adjacent the air outlet 81. That is, since air is flowing perpendicular through screen 82 and into outlet 81, the air will carry paper and paper board outwardly against tube 82 along length 90 unless the kinetic energy of the paper and paper board is sufficiently great to allow the foreign material to move in the direction of arrow 74 past length 90. Thus, pump 79 should be sufficiently sized so that the velocity of air and foreign material in the direction of arrow 74 within tube 82 along critical length 90 exceeds, in the case of a vertical passage, a predetermined amount equal to the sum of 250 feet per minute and 20 percent of the entrance velocity of the air and foreign material as it passes through collar 72. In the event the paper or cardboard material is flowing through either a horizontal passage or through a passage oriented at a forty-five degree angle relative to the vertical, such as, shown in FIGS. 7 and 8 in lieu of a vertical passage, then the velocity of air and foreign material in the direction of arrow 74 within tube 82 along critical length 90 should exceed a predetermined amount equal to the sum of 200 feet per minute and 20 percent of the entrance velocity of the air and foreign material as it passes through collar 72. Eventually the foreign material will exit outlet 88 and into receptacle 86.

An interior cylindrical wall 76 is positioned between tube 82 and outer wall 71 and is mounted to outer wall 71 by radial vanes or other suitable means. The top end 91 of wall 76 is spaced apart from intermediate wall 80, in turn, perpendicularly joined to and connecting wall 71 with annular collar 72. Air outlet 81 is thereby formed between end 91 and wall 80. Perforated tube 82 and passage 77 are cylindrical in configuration and extend from the air and foreign material inlet 73 to the air and foreign material outlet 88. Outlet 81 located at one end of wall 76 is positioned adjacent the air and foreign material inlet 73, whereas the disc-shaped flange 83 is attached to the lower adjacent end of inner wall 76. The inner outlet 81 is annular in configuration and continuously surrounds tube 82. Flange 83 is located within receptacle 86 but is spaced apart from the receptacle sidewall forming an entrance 84 into passage 77. Likewise, wall 76 is spaced apart from the sidewall of receptacle 86 allowing the air within receptacle 86 to first exit the receptacle via opening 84 and then pass between the receptacle sidewall and walls 76 via opening 92 into passage 77. An air vent is formed by opening 84 allowing the pump to withdraw air within receptacle 86 into the outer air passage 93. The air vent extends around the conduit formed by wall 71.

In operation, air within tube 82 is drawn outwardly along the entire length of tube 82 flowing into passage 77 and then forced upwardly flowing around the top end 91 of inner wall 76 and then downwardly toward pump 79. Wall 76 therefore divides passage 77 into an outer passage 93 and an inner passage 118 in fluid communication with each other. The inner passage 118 is formed between tube 82 and wall 76 whereas the outer passage is formed between walls 76 and 71. Wall 71 includes an outer air outlet 94 in fluid communication with passage 77 and pump 79 allowing the air within passage 77 to flow outwardly via the pump.

An alternate preferred embodiment of the material separator 70 (FIG. 7) is shown as material separator 100 in FIG. 8. Separator 100 is identical to separator 70 with the exception that a second air pump or inducer 101 may be used in addition to or in lieu of the air pump or inducer 79. Further, the air vent 84 (FIG. 7) is not provided in material separator 100 and instead the outer cylindrical wall 71 (FIG. 8) which projects into receptacle 86 is solid. Further, a filter 102 is mounted atop receptacle 86 having an outlet aperture 103 for air within the receptacle to flow upwardly in the direction of arrow 104 through a conventional filtering screen, in turn, connected via tube 105 connected to air inducer 79.

The air and foreign material inlet 73 of separator 100 is connected via tube 106 to air inducer 101 which is operable to force the air and foreign material into the separator in the direction of arrow 107. Separator 100 has an air and foreign material outlet 88 and an inner air outlet 81 as described for the separator shown in FIG. 7. Likewise, a perforated tube or screen 82 may be mounted within and spaced apart from the cylindrical wall 71 forming an annular air passage 77 therebetween in fluid communication with the inner air outlet 81. Thus, as previously described, a portion of the air flowing in the direction of arrow 74 may exit via air outlet 81 and then into passage 77 in fluid communication with outlet tube 117. Tube 117 is connected directly to tube 108 of inducer 79 and is shown in fragment. That is, the air exiting the tube 117 flows in the direction of arrow 109 into and continues in the direction of arrow 110 into tube 108 through inducer 79 and then to the atmosphere via outlet tube 111. Thus, inducer 79 is operable to not only draw air through outlet 81 via tubes 117 and 108, but also through filter 102 in the direction of arrow 104.

Three separate inducer conditions are possible with the version of the separator as shown in FIG. 8. For example, the material-laden air can be passed through inducer 101 and blown into the separator without the use of inducer 79. In the first condition, a positive pressure is created in receptacle 86 while air is forced outwardly from the separator in the direction of arrow 109. Alternatively, air can be drawn through the separator through the use of only inducer 79 which creates a negative pressure in receptacle 86 without the use of inducer 101. A third alternative is to utilize both inducers 79 and 101 at both positions shown in FIG. 8 with each inducer being adjustable to control the air pressure in receptacle 86. Such arrangement may be used on material conveying systems in that a neutral pressure condition is typically desired in the receiver chamber of a bailor, compactor, or storage bin.

When using both inducers 101 and 79, the inducers or air pumps are arranged or positioned as shown in FIG. 8 to force air and foreign material through inlet 73 at an entrance velocity sufficiently great to force foreign material within tube 82 through air and foreign material outlet 88 and a portion of air through inner air outlet 81 so that velocity of air and foreign material within tube 82 toward air and foreign material outlet 88 along critical length 90 exceeds a predetermined amount limiting adherence of said foreign material to the screen. As previously discussed, in the event the paper or cardboard material is flowing through either a horizontal passage or through a passage oriented at a forty-five degree angle relative to the vertical, such as, shown in FIG. 8, then the velocity of air and foreign material in the direction of arrow 74 within tube 82 along critical length 90 should exceed a predetermined amount equal to the sum of 200 feet per minute and 20 percent of the entrance velocity of the air and foreign material.

I have discovered that screen 82 is beneficial when directing light materials, such as paper, cardboard, and chips but is not necessary when materials with greater mass densities are separated. The separation principle, however, is the same; the conveying air is drawn off by outlet or slot 81 in a short enough distance that the forward motion of the particulate is not redirected to exhaust slot 81. Notably, when both inducers 79 and 101 are utilized, they are positioned on opposite sides of air outlet 81. That is, inducer 101 is located on the inlet side of outlet 81, whereas inducer 79 is located and in communication with the outlet side of outlet 81 thereby allowing the inducers to work as a pair controlling the flow of air through outlet 81.

While the invention has been illustrated and described in detail in the drawings and foregoing description, the same is to be considered as illustrative and not restriction in character, it being understood that only the preferred embodiments have been shown and described and that all changes and modifications that come within the spirit of the invention are desired to be protected.

What is claimed is:

1. An air/foreign material separator comprising:

an inlet conduit having an air and foreign material inlet, an air and foreign material outlet, an inner air outlet located therebetween:

a perforated tube mounted within and spaced apart from said inlet conduit forming an annular air passage therebetween in fluid communication with said inner air outlet, said tube extending across said inner air outlet limiting flow of foreign material therethrough and having a plurality of holes through which some of said air within said tube flows into said passage and sized to limit flow of foreign material into said passage, said tube extending through a critical length by said inner air outlet;

a first air pump connected to said inlet;

a second air pump connected to said inner air outlet, said first air pump and said second air pump arranged to withdraw air and foreign material through said inlet at an entrance velocity sufficiently great to force foreign material within said tube through said air and foreign material outlet and a portion of air within said tube through said inner air outlet so that velocity of air and foreign material within said tube toward said air and foreign material outlet along said critical length exceeds a predetermined amount limiting adherence of said foreign material to said perforated tube; and, a receiver connected to said air and foreign material outlet to receive foreign material introduced via said inlet into said tube.

2. The separator of claim 1 wherein:

said perforated tube and said annular passage extend from said air and foreign material inlet to said air and foreign material outlet and are cylindrical in configuration.

3. The separator of claim 2 and wherein:

said inner air outlet is located adjacent said air and foreign material inlet and within said conduit.

4. The separator of claim 3 wherein:

said conduit has an outer wall and an inner wall connected together but spaced apart forming an outer air passage therebetween, said inner wall and said tube are spaced apart forming said annular air passage, said inner air outlet extends through said inner wall, said outer wall includes an outer air outlet connected to said second air pump which is in communication via said outer air outlet and said outer air passage with said inner air outlet.

5. The separator of claim 4 wherein:

said receiver includes a filtered air vent allowing said second air pump to withdraw air within said receiver.

6. An air/foreign material separator comprising:

an inlet conduit having an air and foreign material inlet, an air and foreign material outlet, an inner air outlet located therebetween;

a tube mounted within and spaced apart from said inlet conduit forming an annular air passage therebetween in communication with said inner air outlet, said tube extending across said inner air outlet limiting flow of foreign material therethrough and having a plurality of holes through which some of said air within said tube flows into said passage and sized to limit flow of foreign material into said passage;

a first air pump;

a second air pump connected to said inner air outlet to force with said first air pump air and foreign material through said inlet at an entrance velocity sufficiently great to force foreign material within said tube through said air and foreign material outlet and a portion of air within said tube through said inner air outlet so that velocity of air and foreign material within said tube toward said air and foreign material outlet is sufficient to move all of said foreign material past said inner air outlet to said air and foreign material outlet; and, a receiver connected to said air and foreign material outlet to receive foreign material introduced via said inlet into said tube.

7. The separator of claim 6 wherein:

said conduit has an outer wall and an inner wall connected together but space apart forming an outer air passage therebetween, said inner wall and said tube are spaced apart forming said annular air passage, said inner air outlet surrounds said tube and extends through said inner wall, said outer wall includes an outer air outlet connected to said second air pump which is in communication via said outer air outlet and said outer air passage with said inner air outlet.

* * * * *